US012630024B1

(12) United States Patent
Berdut-Teruel

(10) Patent No.: US 12,630,024 B1
(45) Date of Patent: May 19, 2026

(54) MAGNETICALLY SUSPENDED AND POWERED TRAIN

(71) Applicant: Elberto Berdut-Teruel, San Juan, PR (US)

(72) Inventor: Elberto Berdut-Teruel, San Juan, PR (US)

( * ) Notice: Subject to any disclaimer, the term of this patent is extended or adjusted under 35 U.S.C. 154(b) by 0 days.

(21) Appl. No.: 19/388,068

(22) Filed: Nov. 13, 2025

Related U.S. Application Data

(60) Provisional application No. 63/891,413, filed on Oct. 1, 2025.

(51) Int. Cl.
B60L 13/08 (2006.01)

(52) U.S. Cl.
CPC .................................... B60L 13/08 (2013.01)

(58) Field of Classification Search
CPC ........ E01B 25/32; E01B 25/305; E01B 25/30; B65G 54/02; B61B 13/08; B60L 13/10; B60L 13/03; B60L 13/06; B60L 13/04; B60L 13/08
USPC .................................................. 104/286, 281
See application file for complete search history.

(56) References Cited

U.S. PATENT DOCUMENTS

| | | | | | |
|---|---|---|---|---|---|
| 3,780,668 A | * | 12/1973 | Schwarzler | ............. | B61B 13/08 |
| | | | | | D12/40 |
| 3,820,470 A | * | 6/1974 | Karch et al. | ............ | B60L 13/08 |
| | | | | | 310/90.5 |

| | | | | | |
|---|---|---|---|---|---|
| 3,834,317 A | * | 9/1974 | Miericke | ................. | B61B 13/08 |
| | | | | | 104/285 |
| 3,847,087 A | * | 11/1974 | Lichtenberg | ............ | B60L 13/10 |
| | | | | | 310/90.5 |
| 5,165,347 A | * | 11/1992 | Wagner | ................... | B60L 13/06 |
| | | | | | 104/283 |
| 5,218,257 A | * | 6/1993 | Tozoni | ................... | H02K 41/03 |
| | | | | | 310/90.5 |
| 5,319,275 A | * | 6/1994 | Tozoni | ................... | B60L 13/04 |
| | | | | | 310/90.5 |
| 5,388,527 A | * | 2/1995 | Thornton | ............... | B60L 13/08 |
| | | | | | 104/285 |
| 7,587,982 B2 | * | 9/2009 | Li | ........................... | B60L 13/04 |
| | | | | | 104/284 |
| 8,850,989 B2 | * | 10/2014 | Hunter | ................... | B60L 13/04 |
| | | | | | 310/90.5 |
| 9,604,547 B2 | * | 3/2017 | Bögl | ........................ | B61D 1/00 |
| 10,604,898 B2 | * | 3/2020 | Noe | ........................ | B61B 13/08 |
| 11,155,281 B2 | * | 10/2021 | Hosseini | ................ | B60L 13/10 |
| 11,312,398 B2 | * | 4/2022 | Grip | ........................ | B61B 13/10 |
| 11,801,756 B2 | * | 10/2023 | Deng | ...................... | B60L 13/06 |
| 11,981,355 B2 | * | 5/2024 | Araie | ....................... | B61B 3/02 |
| 12,103,569 B2 | * | 10/2024 | Chen | ...................... | B61B 13/08 |

(Continued)

FOREIGN PATENT DOCUMENTS

| | | | | | |
|---|---|---|---|---|---|
| CN | 110295519 A | * | 10/2019 | .......... | E01B 25/305 |
| CN | 113085565 A | * | 7/2021 | ............. | B60L 13/08 |

(Continued)

*Primary Examiner* — S. Joseph Morano
*Assistant Examiner* — Maxwell L Meshaka
(74) *Attorney, Agent, or Firm* — Luis Figarella

(57) ABSTRACT

A proposed magnetically supported vehicle that has a vertical lift system comprised of permanent magnets mechanically linked to a chassis or body in order to provide minimal friction motion along a railway as well as lateral stability. The proposed magnets being one or a combination of ceramic or ferrous magnets.

4 Claims, 15 Drawing Sheets

(56)  References Cited

U.S. PATENT DOCUMENTS

| | | | |
|---|---|---|---|
| 2006/0145551 A1* | 7/2006 | Rozmus ................ | F16C 29/045 |
| | | | 310/90.5 |
| 2007/0095245 A1* | 5/2007 | Li ........................... | B60L 13/04 |
| | | | 104/284 |
| 2012/0139374 A1* | 6/2012 | Hunter .................... | B60L 13/04 |
| | | | 310/90.5 |
| 2015/0040791 A1* | 2/2015 | Bogl ....................... | B60L 13/04 |
| | | | 104/286 |
| 2018/0030662 A1* | 2/2018 | Noe ........................ | B60L 13/04 |
| 2018/0186389 A1* | 7/2018 | Hosseini ................. | B61B 13/08 |
| 2022/0001902 A1* | 1/2022 | Araie ...................... | B61B 3/02 |
| 2022/0009531 A1* | 1/2022 | Hosseini ................. | B60L 13/08 |
| 2022/0032783 A1* | 2/2022 | Swiatek .................. | B60L 13/00 |
| 2023/0241980 A1* | 8/2023 | Deng ...................... | B60L 13/04 |
| 2024/0253672 A1* | 8/2024 | Chen ....................... | B61B 1/00 |
| 2025/0183832 A1* | 6/2025 | Abou Harfouch ...... | B60L 13/08 |

FOREIGN PATENT DOCUMENTS

| | | | | | |
|---|---|---|---|---|---|
| CN | 115214378 A | * | 10/2022 | ............ | H02N 15/00 |
| CN | 115341418 A | * | 11/2022 | ............ | B60L 13/03 |
| FR | 2730106 A1 | * | 8/1996 | ............ | H02N 15/00 |
| KR | 20110054176 A | * | 5/2011 | ............ | B65G 35/06 |
| KR | 20110054177 A | * | 5/2011 | ............ | B60L 13/04 |
| KR | 20140087677 A | * | 7/2014 | ............ | B60L 13/04 |
| WO | WO-2012048664 A1 | * | 4/2012 | ............ | H02K 7/11 |
| WO | WO-2020155973 A1 | * | 8/2020 | ............ | B60L 13/04 |
| WO | WO-2022036244 A1 | * | 2/2022 | ............ | B60L 53/39 |
| WO | WO-2025172577 A1 | * | 8/2025 | ............ | H02K 11/35 |

* cited by examiner

900

MAGNETICALLY SUSPENDED AND POWERED TRAIN

CROSS-REFERENCE TO RELATED APPLICATIONS

This application claims priority to U.S. Provisional patent application Ser. No. 63/891,413 titled "Magnet Motor Transmission", filed on Oct. 1, 2025, the disclosure of which is herein incorporated by reference in their entirety.

PATENTS CITED

The following documents and references are incorporated by reference in their entirety, Berdut (U.S. Pat. No. 5,452, 663), Wang (CN 1271663).

FIELD OF THE INVENTION

The disclosure relates to a magnetically suspended transportation vehicle, and specifically to a permanent magnet levitated train.

DESCRIPTION OF THE RELATED ART

There are many electromagnetic friction reduction transportation devices, where one or more cabins of a moving vehicle are displaced above a track through the use of electromagnets. The limitations of these systems are well known, and primarily are related to matters of cost and safety.

What is needed, is a magnetic suspension and motion solution that can both suspend the train modules and provide motion and braking of the train modules with little or no contact with the track on which it is suspended.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a magnetic suspension system for trains, said magnetic suspension system comprising: one or more suspension/dampening assemblies per side, each said suspension/dampening assembly comprised of: one or more permanent magnet support columns per side, each said column comprised of one or more magnetic nodules and each said magnetic nodule comprised of a central body having a North Polarity (N-Pol) permanent magnet on one side, and a South Polarity (S-Pol) permanent magnet on the other; and one or more lateral support wheel or skid per side along the upper portion of said magnet support column; and one or more lateral support wheel, ball-bearing or skid per side along the lower portion of said magnet support column, a track having one or more magnet support column canals per side, said column support canals comprised of: a continuous running opening having a depth and width capable of accommodating said permanent magnet support column and one continuous ferrous metal rail per side of each said canal. In another aspect, a traction canal within said track, said traction canal comprising: a center slab having a ferrous, non-ferrous or combination rail on each side, a right magnetic caterpillar track and a left magnetic caterpillar track, each said track comprised of: alternate N-Pol and S-Pol magnetic slabs mounted on a continuous belt around two or more hubs and one or more motors to rotate each said right and left caterpillar track. In yet another aspect a traction canal within said track, said traction canal comprised of a horizontal center slab having a ferrous, non-ferrous or combination rail on each side, a magnetic caterpillar track comprised of: alternate N-Pol and S-Pol magnetic slabs mounted on a continuous belt around two or more hubs and one or more motors to rotate each said right and left caterpillar track.

In one aspect, the invention is about a method for operating a magnetic suspension train, said method comprising: providing one or more suspension/dampening assemblies per side, each said suspension/dampening assembly comprised of: providing one or more permanent magnet support columns per side, each said column comprised of one or more magnetic nodules and each said magnetic nodule comprised of a central body having a North Polarity (N-Pol) permanent magnet on one side, and a South Polarity (S-Pol) permanent magnet on the other and providing one or more lateral support wheel or skid per side along the upper portion of said magnet support column and providing one or more lateral support wheel, ball-bearing or skid per side along the lower portion of said magnet support column providing a track having one or more magnet support column canals per side, said column support canals comprised of: providing a continuous running opening having a depth and width capable of accommodating said permanent magnet support column, providing one continuous ferrous metal rail per side of each said canal and operating said train. In another aspect, a traction canal within said track, said traction canal comprising: a center slab having a ferrous, non-ferrous or combination rail on each side, a right magnetic caterpillar track and a left magnetic caterpillar track, each said track comprised of: alternate N-Pol and S-Pol magnetic slabs mounted on a continuous belt around two or more hubs and one or more motors to rotate each said right and left caterpillar track. In yet another aspect a traction canal within said track, said traction canal comprised of a horizontal center slab having a ferrous, non-ferrous or combination rail on each side, a magnetic caterpillar track comprised of: alternate N-Pol and S-Pol magnetic slabs mounted on a continuous belt around two or more hubs and one or more motors to rotate each said right and left caterpillar track.

Other features and advantages of the present invention will become apparent upon examining the following detailed description of an embodiment thereof, taken in conjunction with the attached drawings, which are provided for purposes of illustration and not of limitation.

Figure 1:
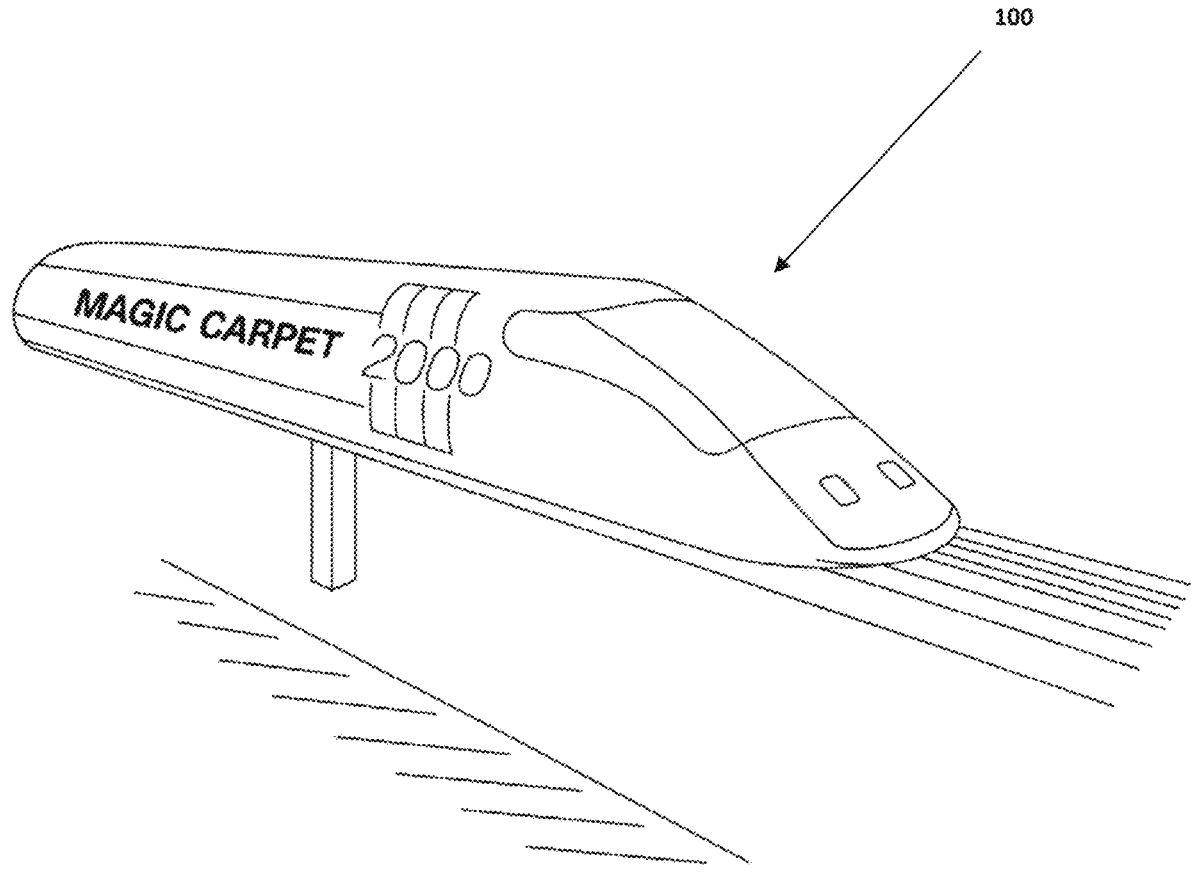
FIG. 1 shows a front perspective of the Magnetically suspended and powered train, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

Figure 2:
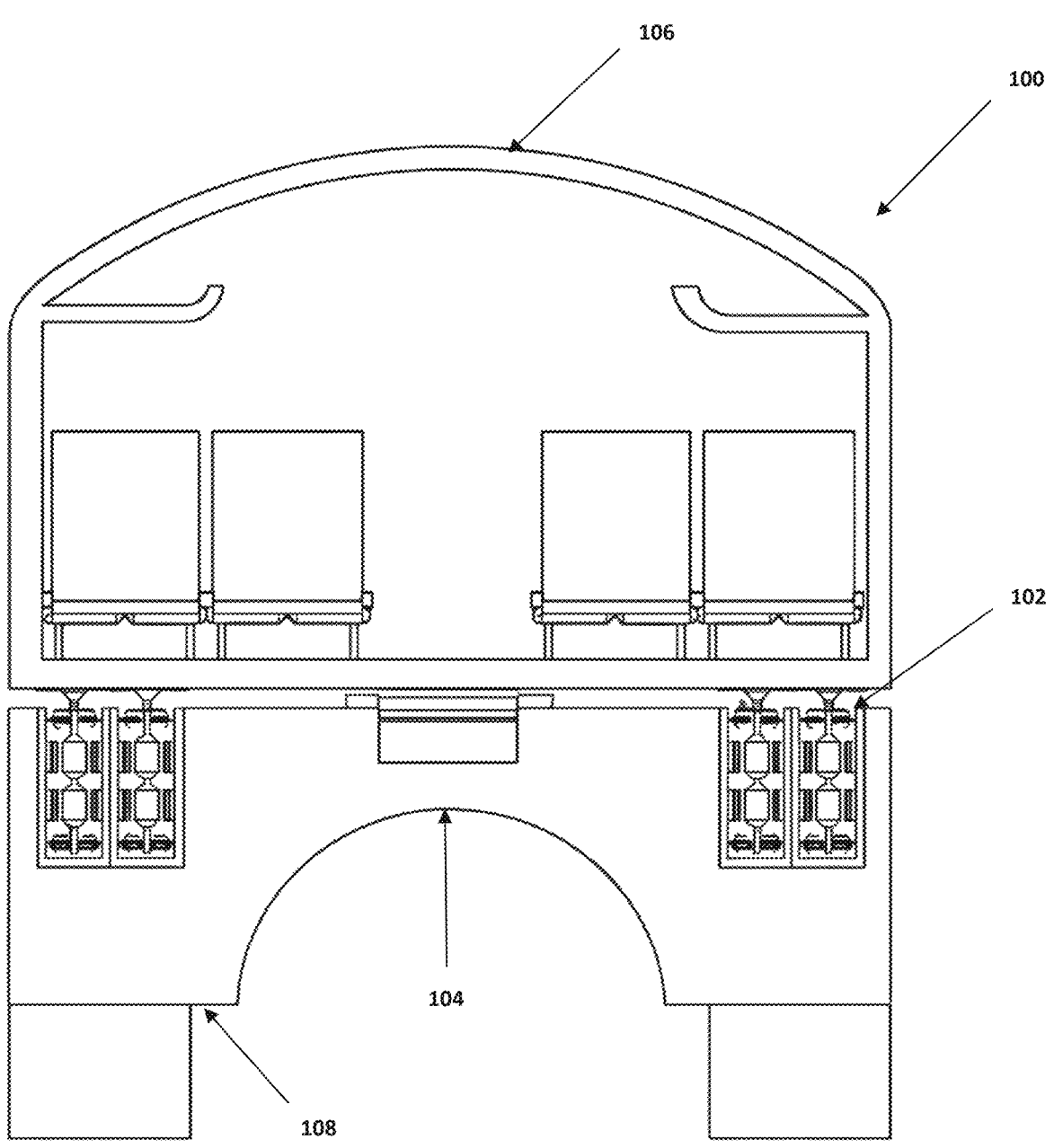
FIG. 2 shows a cross section of the Magnetically suspended and powered train, according to an exemplary embodiment of the invention.
Figure 3:
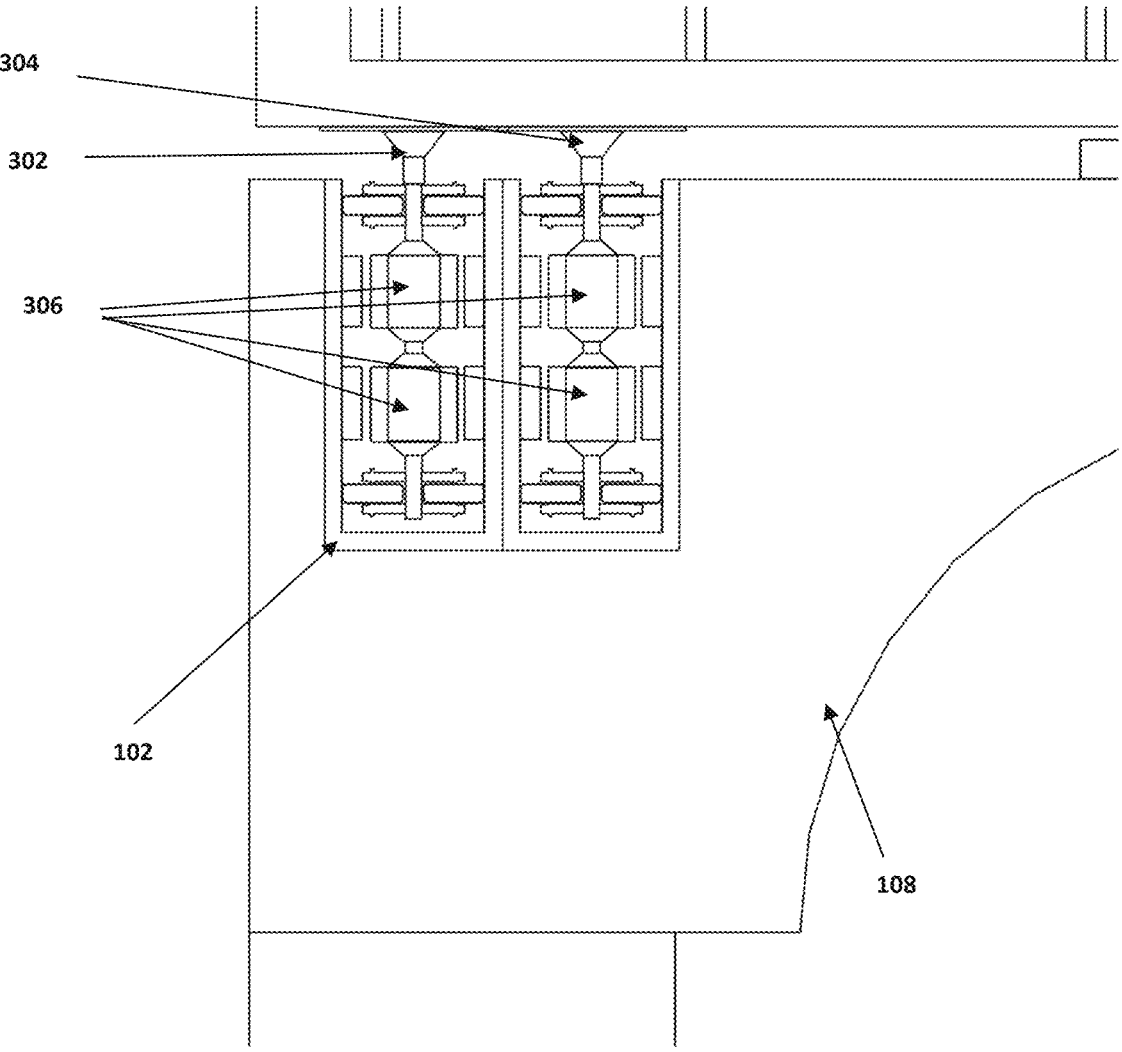
FIGS. 3-7 show cross sections of the magnetic suspension arrangement, according to exemplary embodiments of the invention.
Figure 4:
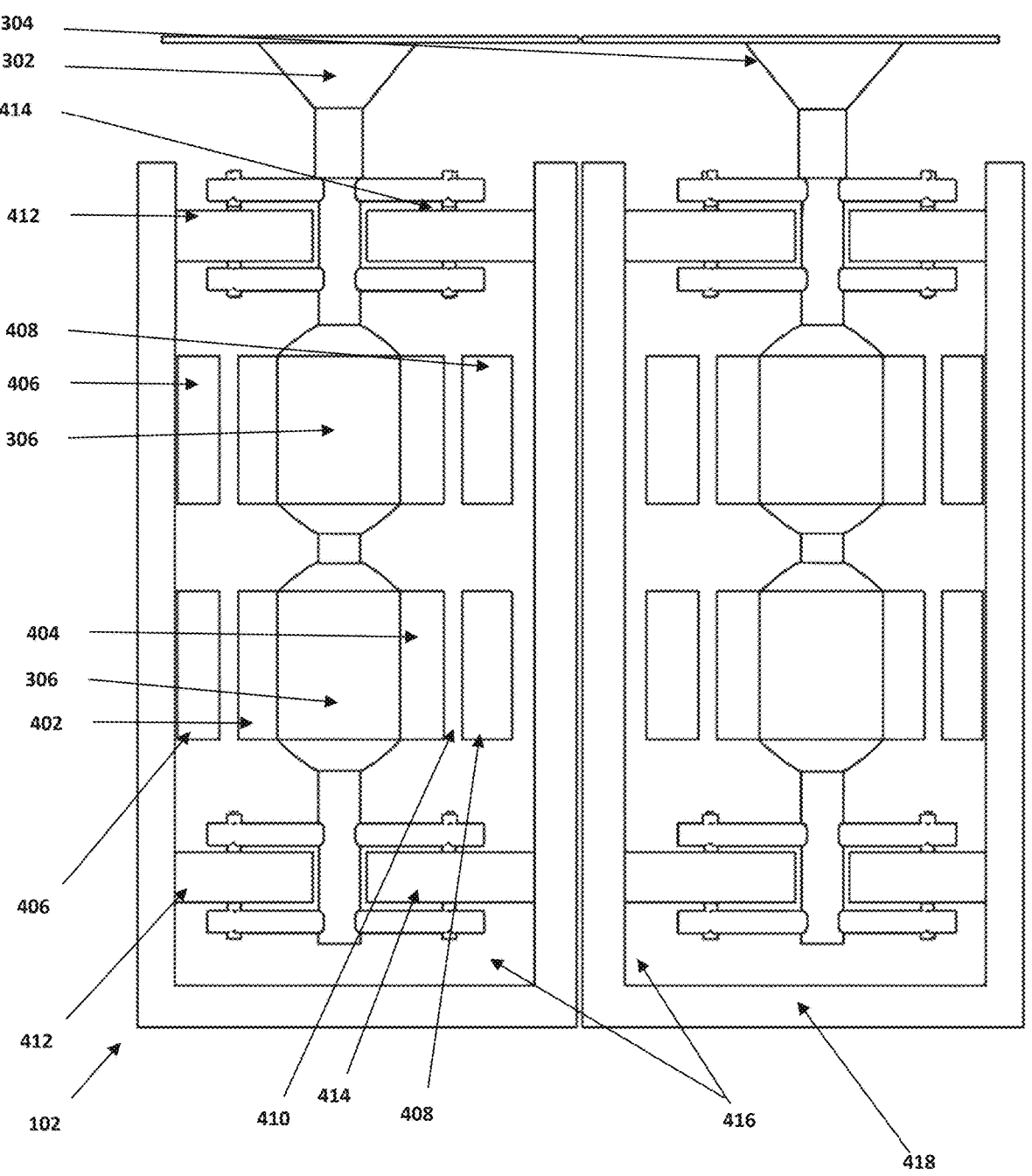
Figure 5:
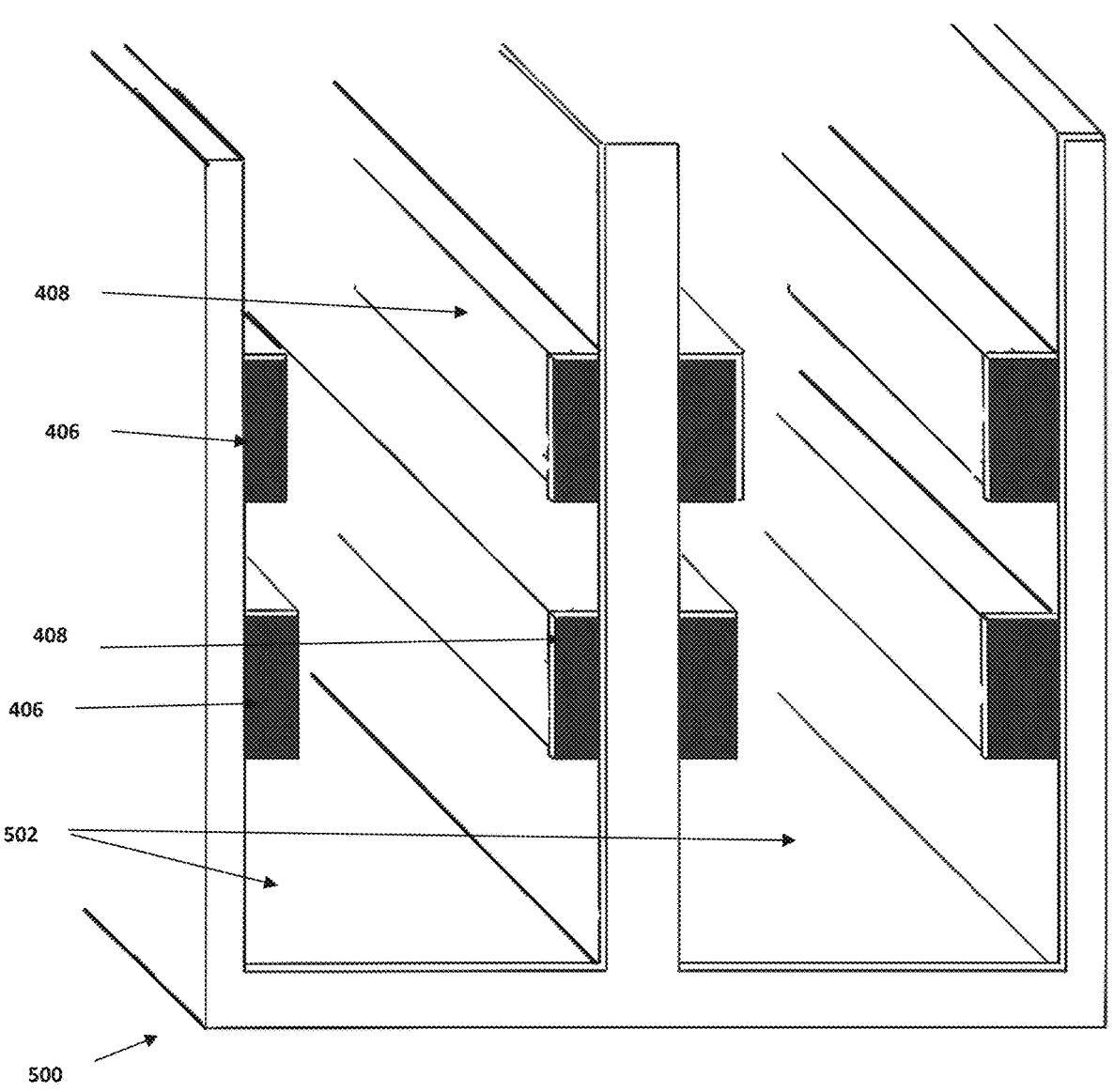
Figure 6:
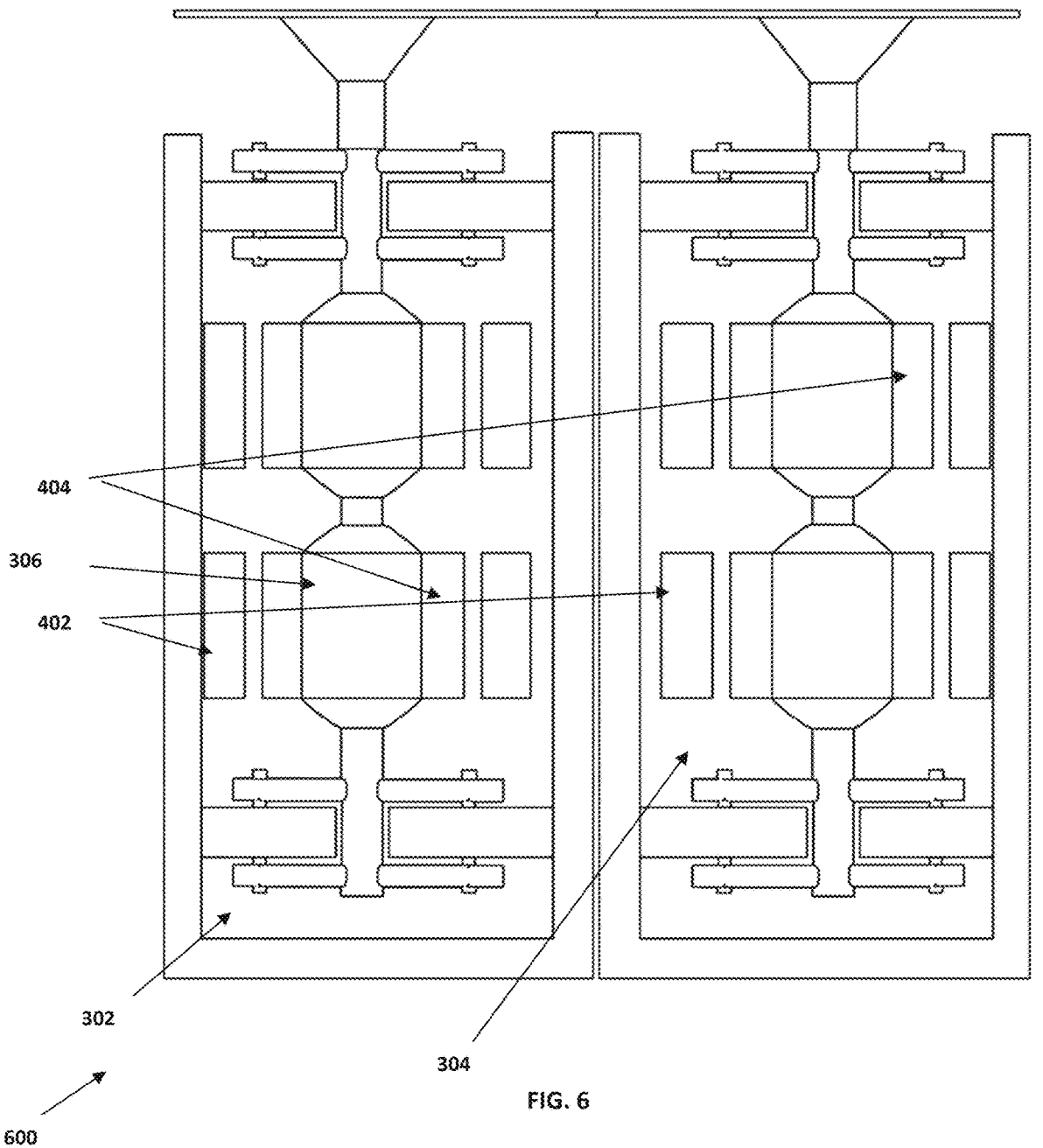
Figure 7:
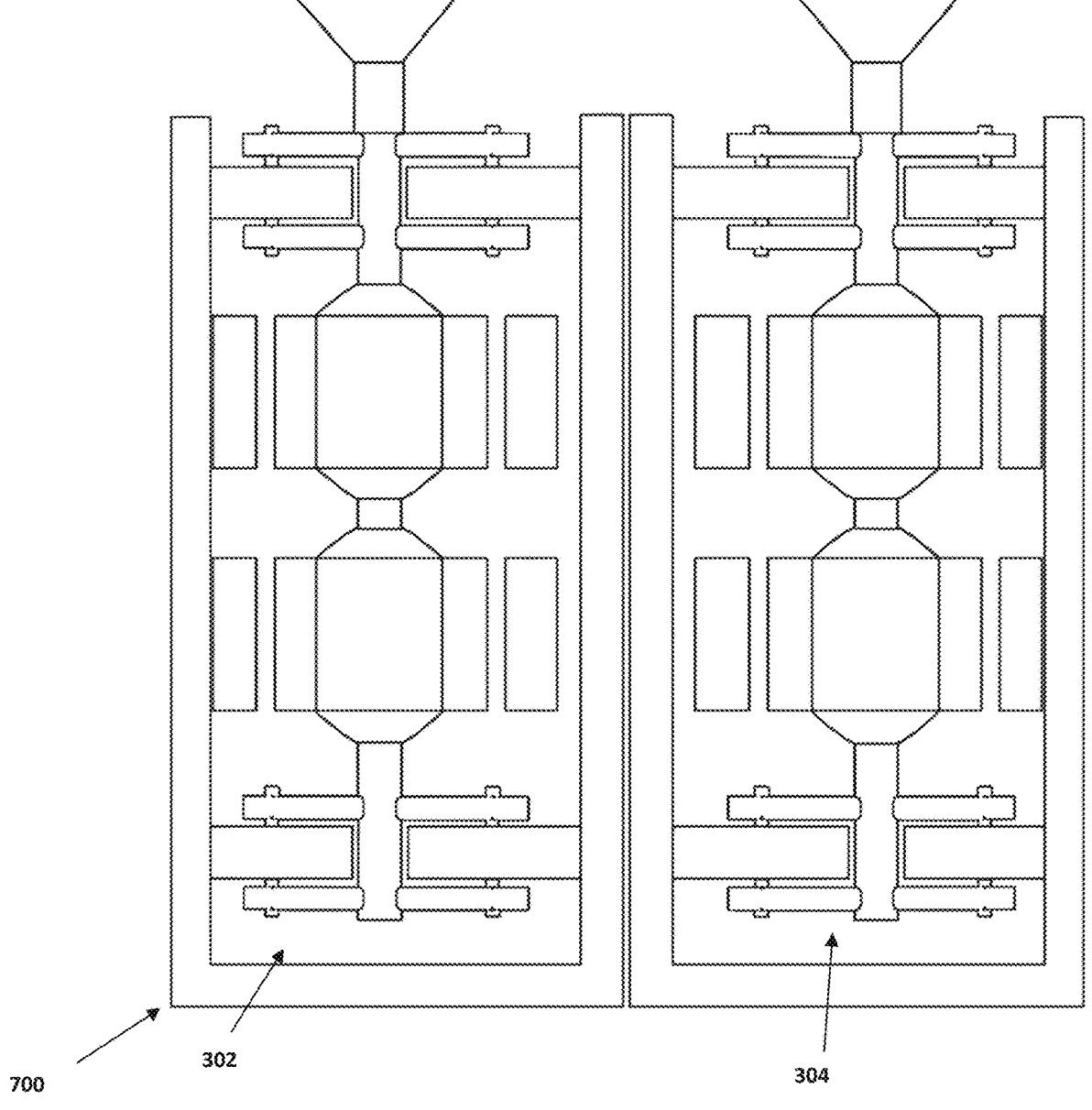
Figure 8:
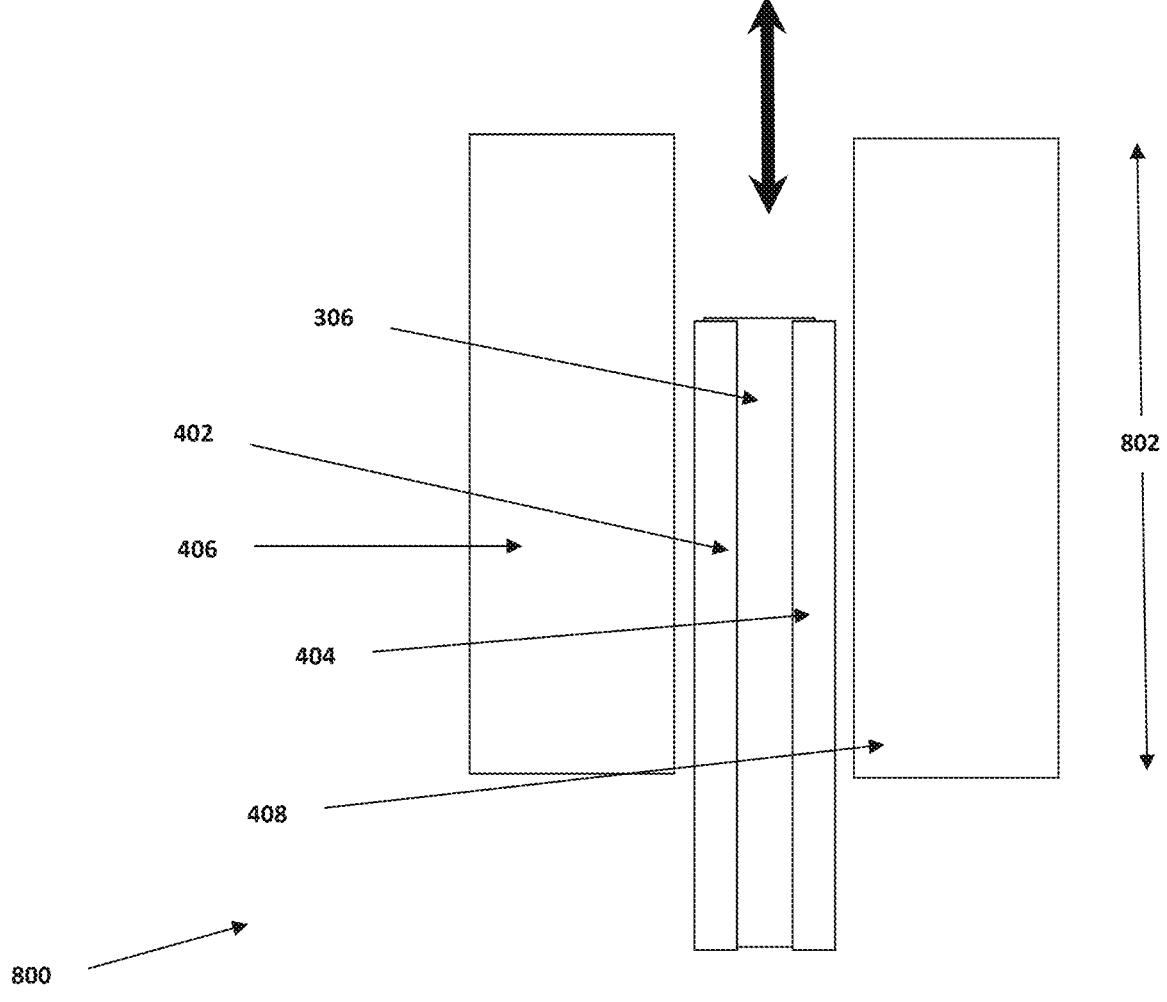
FIGS. 8-9 illustrate suspension mechanism operations, according to an exemplary embodiment of the invention.
Figure 9:
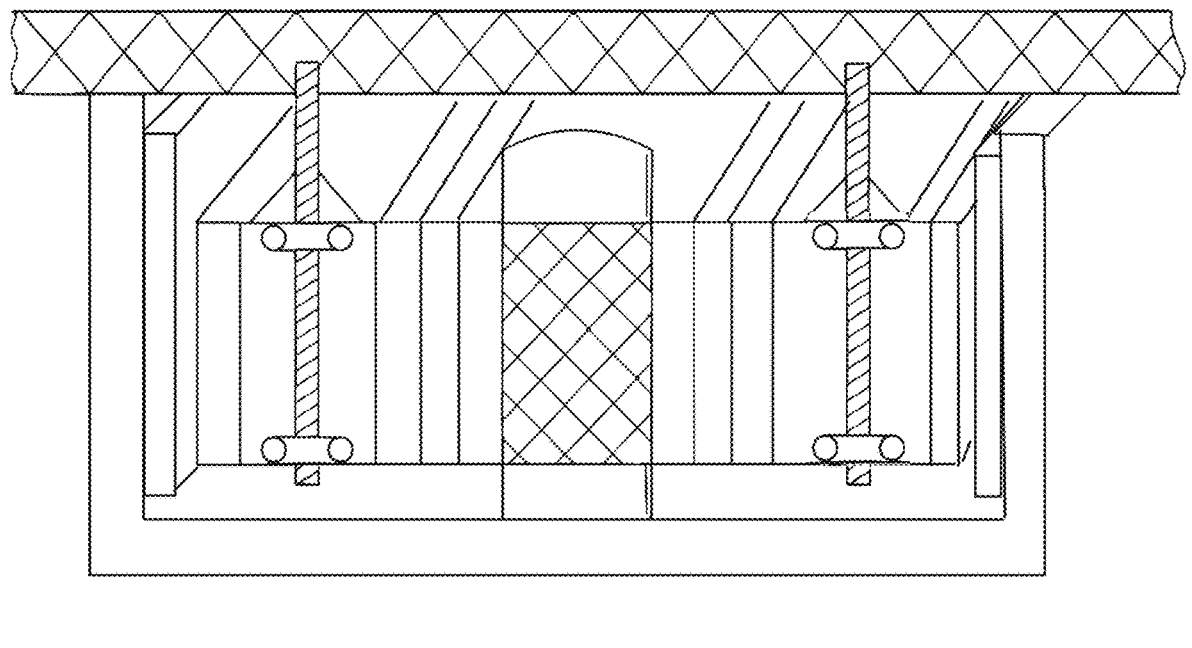
Figure 10:
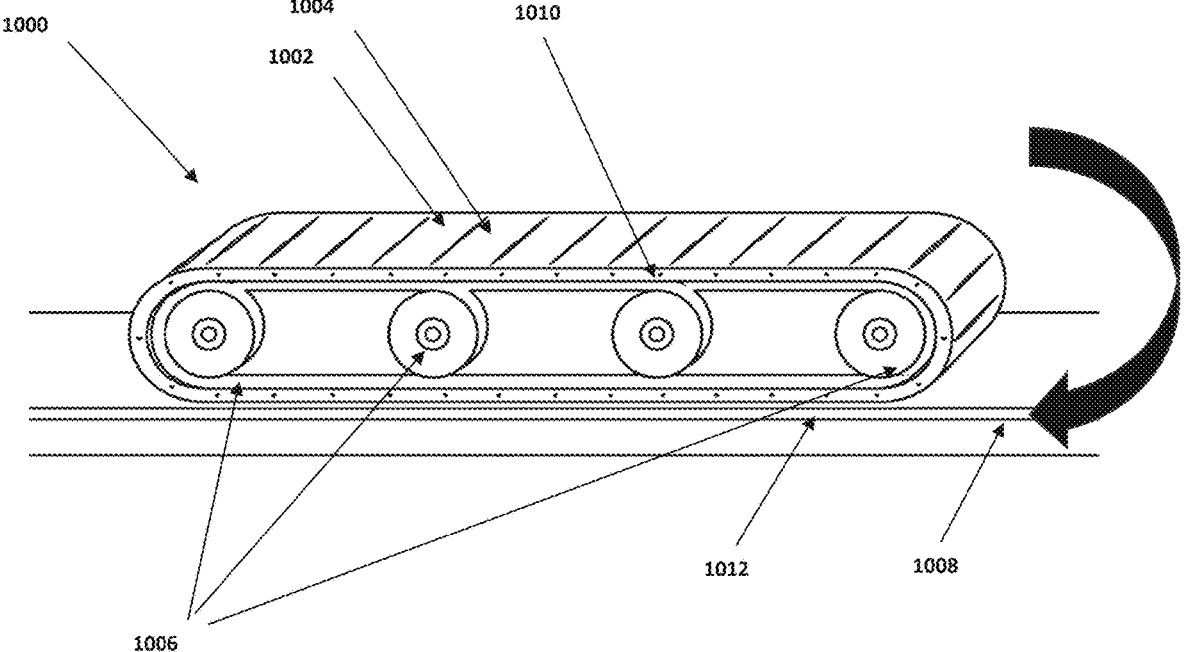
FIG. 10 shows a perspective view of the magnetic caterpillar propulsion system, according to an exemplary embodiment of the invention.
Figure 11:
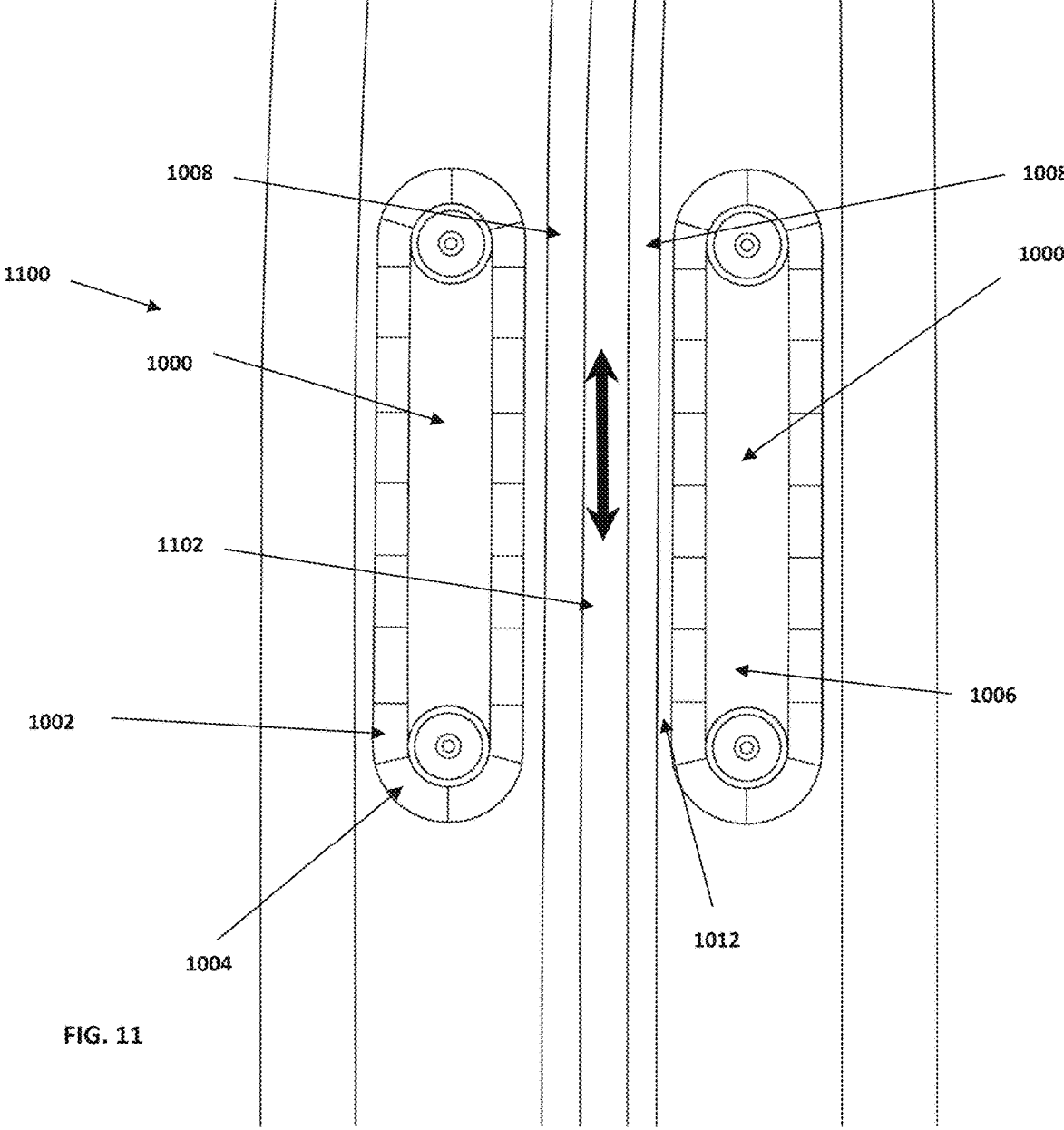
FIG. 11 shows a top view of a proposed magnetic caterpillar propulsion system, according to an exemplary embodiment of the invention.

The present invention, referring to FIGS. 1-2 in one exemplary embodiment is about a train 100 that has one or more train railcar, carriage, coach, wagon, cab or car 106 that is suspended above a track 108, so that the train 100 runs on the track 108 through a no physical contact suspension/dampening assembly 102, with minimal physical contact with the track 108. In one embodiment, the suspension/dampening assembly 102 used these minimal physical contact principally for back up of directional stability. Forward propulsion and braking may be provided in different ways, with one of them being a non-contact magnetic 104 propulsion.

As seen in FIGS. 3-9 each train car 106 is supported over the track 108 by one or more permanent magnet suspension assemblies 102 per side, which are comprised of one or more permanent magnet support columns 302/304. In one embodiment, each said column is comprised of one or more magnetic nodules 306, each said magnetic nodule is comprised of a central body having a North Polarity (N-Pol) permanent magnet 402 on one side, and a South Polarity (S-Pol) permanent magnet 404 on the other. Opposite each of these magnets 402/404 is a ferrous or ferrous-composite rail 406/408, with a gap 410 between the magnets 402/404 and the rails 406/408.

In the above fashion 500, the columns 302/304 fit inside the channel 502, and two or more said channels 416 may be placed on each side of the track 108. The channels 416 may be built from any ferrous or non-ferrous materials, as well as from phenolic and/or combinations thereof (like concrete), with smooth interior walls 418 at certain portions, so that the lateral support wheels, ball bearings or skids 412/414 may be accommodated. These skids 412/414 are placed on each side (top and bottom) to prevent the columns 302/304 from reducing the gap 410 to a point where the magnets 402/404 become attached to the rails 406/408.

As seen 500, the rails 406/408 extend along the channels 502, so that the support column assemblies 302/304 can be suspended along the track 108. The support columns 600 may themselves be comprised of one or more magnetic nodules 306, along the length of the cab 102 length. In another exemplary embodiment, only one nodule 306 per support column 302/304 may be used, although an upper and lower set of lateral support wheels/skids 412/414 is recommended.

Figure 14:
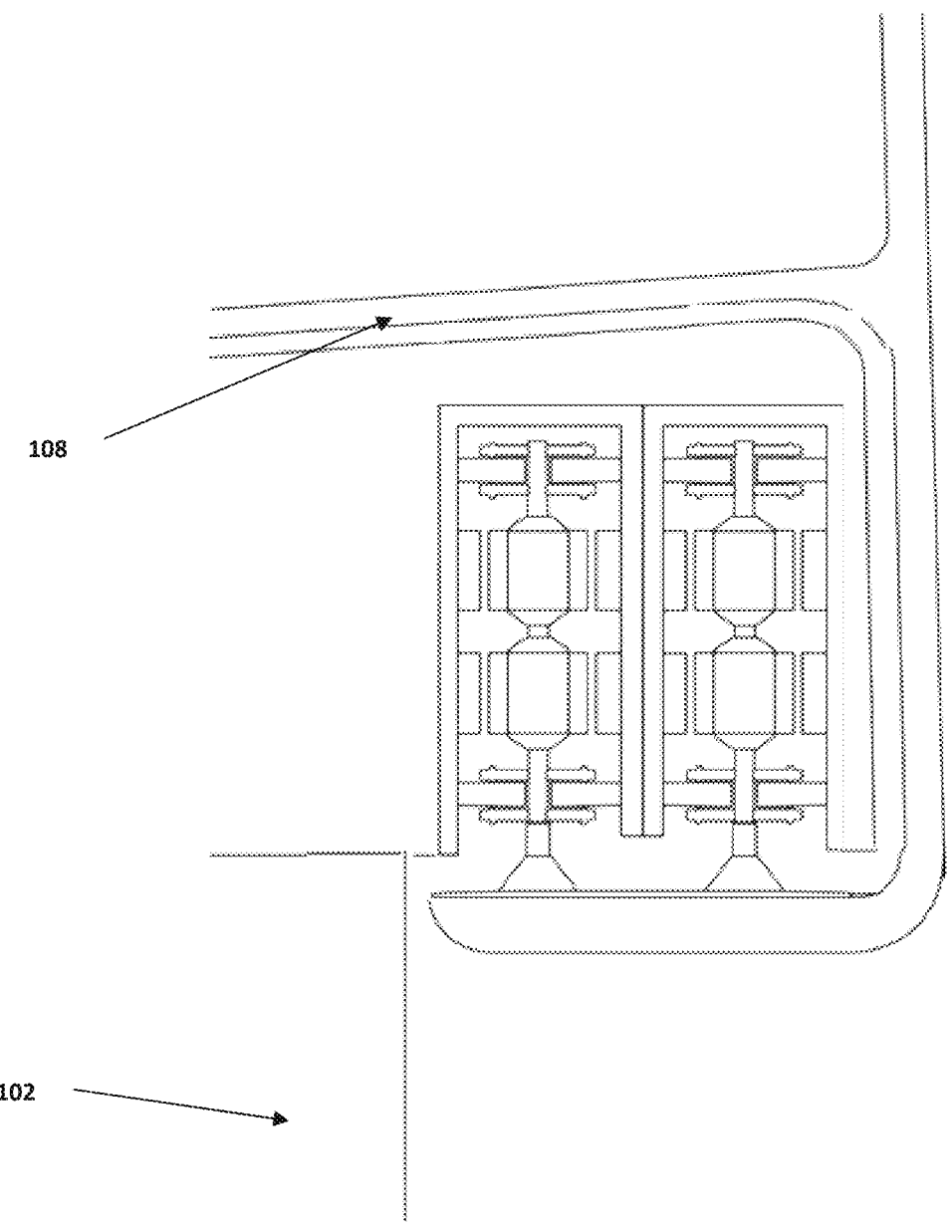
FIG. 14 shows a front view of the magnetically suspended and powered train when the cab is below the tracks, according to an exemplary embodiment of the invention.
Figure 15:
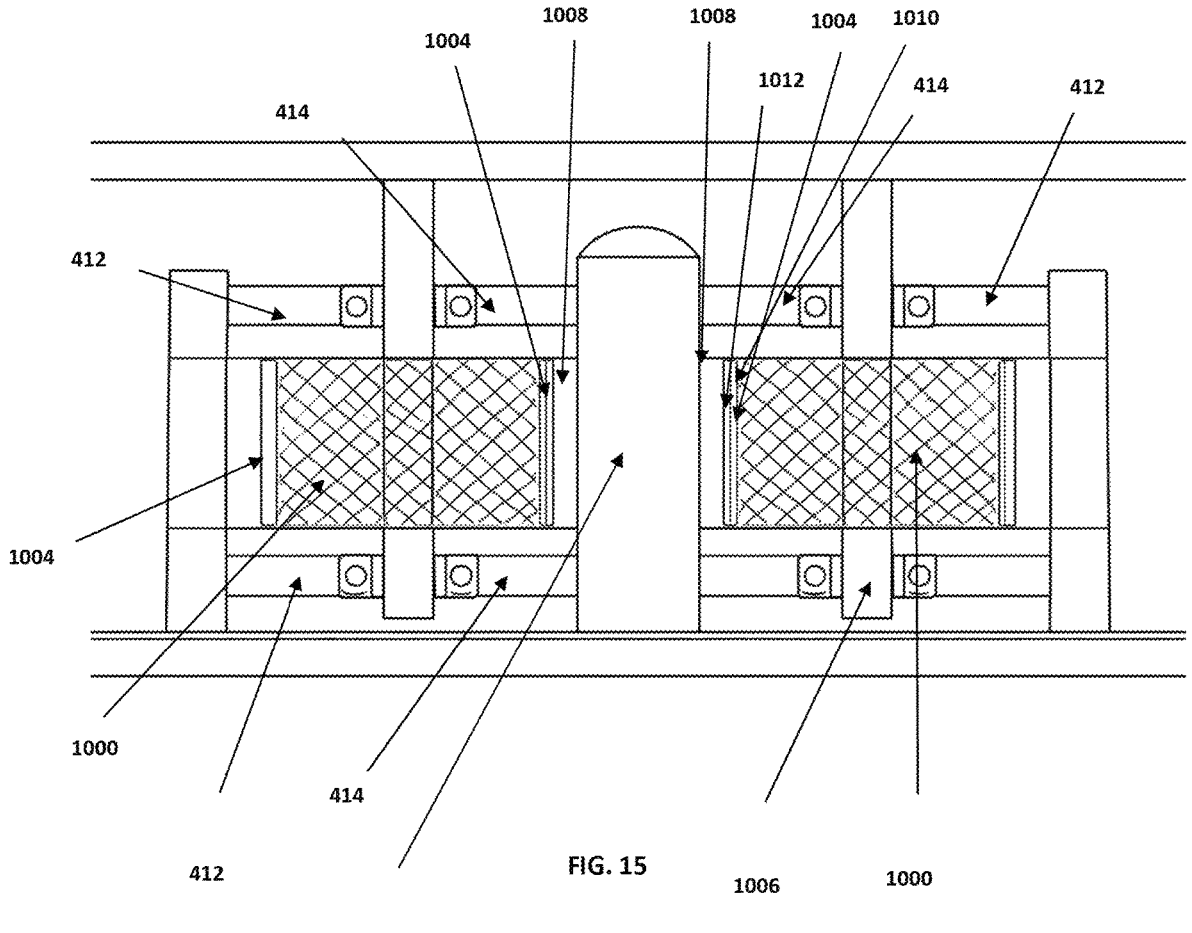
FIG. 15 shows a cross-section view of a proposed central channel magnetic caterpillar propulsion system, according to an exemplary embodiment of the invention.
Figure 16:
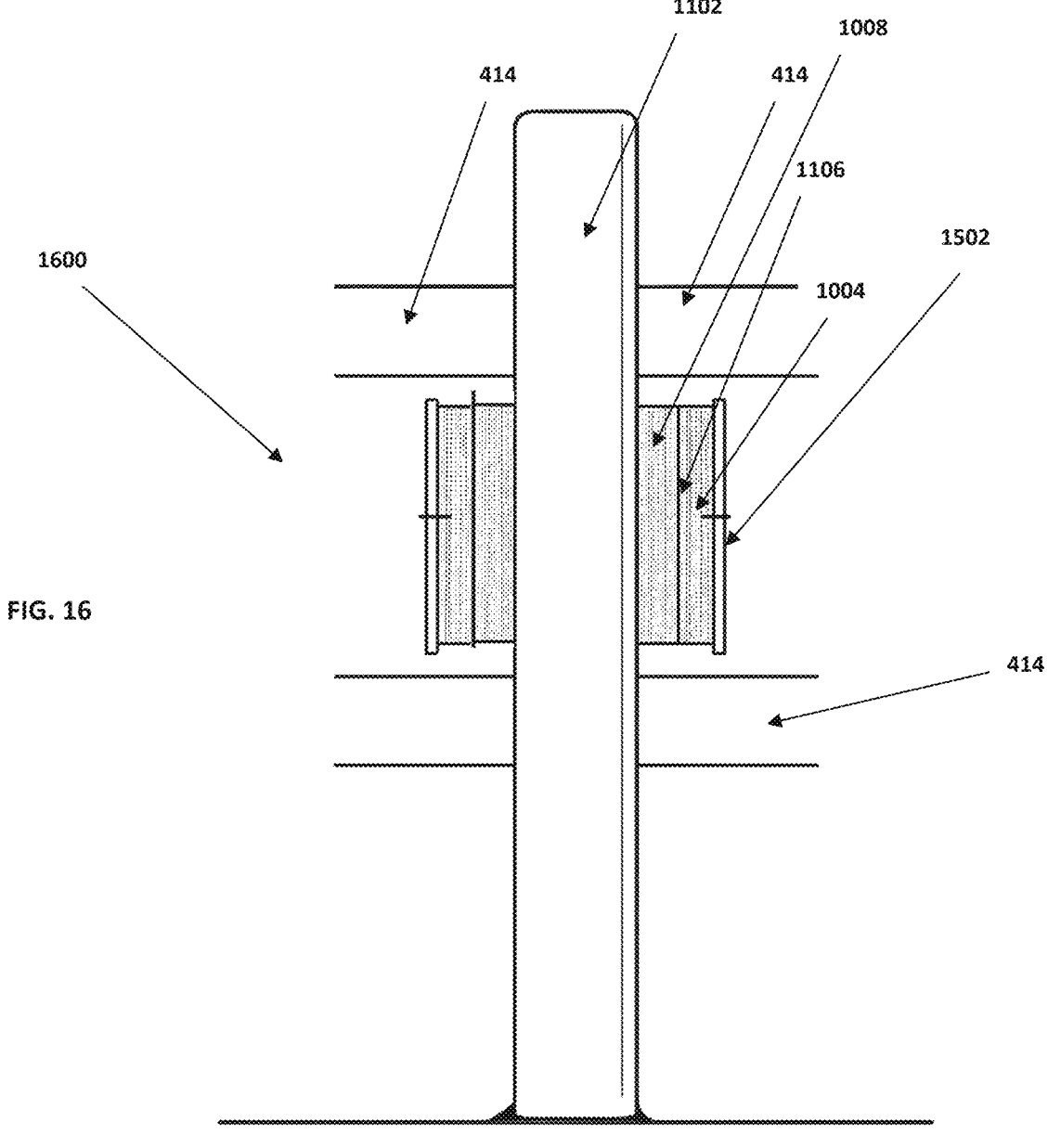
FIG. 16 shows a cross section detailed view of the center channel beam, according to an exemplary embodiment of the invention.

In operation (FIG. 8), the permanent magnets 402/404 remain attracted to the ferrous rails 406/408, but 'held back' by the cancellation of the magnetic attraction. This 'balance' will keep the columns from touching the sides, but under strenuous magnetic attraction. And while the lateral motion is prescribed by the wheels/skids 412/414 making contact with the channel 502 walls, the up/down motion within the magnetic fields is free to occur. What happens, exaggerated 800, will occur when the train cabs 102 are subjected to up/down forces. These forces may be caused by the load (cargo/passengers coming in/out), wind effects on the front and back of the train 100 (caused by either speed or atmospheric conditions), topography of the track (going uphill/downhill). On FIG. 14 we see an embodiment of the invention where the track 108 is above the cab 102, so that the train 100 is 'suspended', resulting in the cab 102 'floating' over the ground.

The magnetic attraction balance on each side 402 to 406 and 404 to 408, provides a neutralizing force that is 'activated' anytime the magnetic nodule 306 goes up or down away from being balanced. When the weight of the cab 102 pushes down, the nodule 306 goes slightly down 800, but then creates an 'up' force on the nodule 306. As long as the up/down displacement of the nodule 306 is less than half the length of the rail 802, then the unit will try to return to 'neutral' (positions seen in 700).

FIGS. 10-11, 12 and 15-16 illustrate two suggested embodiments for the propulsion and braking of the unit using permanent magnets. One exemplary embodiment is a magnetic caterpillar track or belt 1000 comprised of alternate N-Pol 1002 and S-Pol 1004 magnetic 'slabs' mounted on a continuous flexible belt 1010 wound around two or more hubs 1006 and powered by one or more electric or other motors, so that the rotation of the belt 1000 (without actually contacting the surface of the ferrous or non-ferrous metal slab 1008 through a gap 1012) induces a magnetic polarity on the surface of the slab 1008 which causes it to push or pull the magnets 1002/1004 portions of the belt.

As the belt 1000 moves over the surface of the slab 1008, the direction of travel of the belt will result in either forward or rearward motion of the belt 1000, resulting in either forward/rearward motion of the train cab 102. The train 100 may have one or more such belts 1000 per cab 102, or be like a traditional locomotive pulling 'non-powered' carts and have only a powered belt 1000 in the lead cab 102. For braking, the belt may be stopped, so that the attraction to the slab 1008 causes a slowdown, or even be reversed to the direction of travel for maximum deceleration of the train 100.

In another embodiment 1100, the forward/reverse motion is created in a traction canal through a right and a left belt 1000 running within the slot or central canal that has a center slab 1102 comprised of a central support member (built like the walls of the channel 502), with surfaces 1104/1106 that are made of ferrous or non-ferrous metals or combinations thereof and have a gap 1012 on each side. As with the belt 1000, this is able to move the train 100 forward and/or backwards, as well as braking. As we see in the cross-section views (FIGS. 15-16), the belts 1000 gap 1012 is kept in place thanks to the wheels/ball bearings/skids 412/414.

Figures 12, 13:
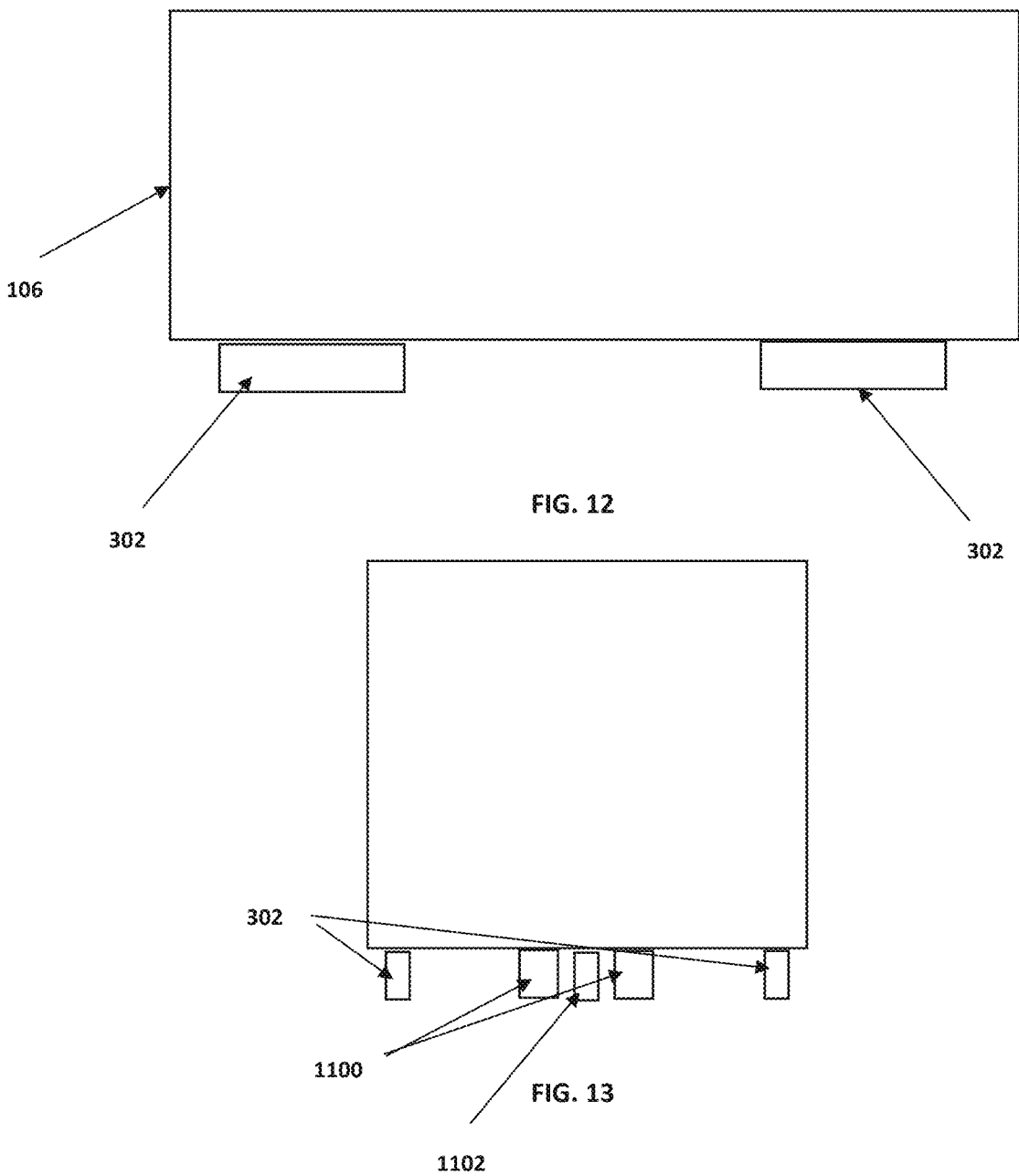
FIG. 12 shows a side view Magnetically suspended and powered train, according to an exemplary embodiment of the invention.
FIG. 13 shows a front view of the magnetically suspended and powered train, according to an exemplary embodiment of the invention.

Referring to FIGS. 12-13 we see that one or more magnetic suspension units 302 may be used per side, in order to support a safety factor above the maximum expected load per car/carriage/cab, and short enough to allow the track to curve as appropriate. The suspension units 302 may be slabs or articulated sections, to ensure they function as magnetic skates that are kept from making contact with the ferrous rails 406/408 by the side wheels/ball bearings/skids 412/414 as seen in 1600.

The above is critical in showing an enablement of a magnetic levitated train that requires no active electromagnets or complicated control schemes, closely approximating the operation and behavior of a steam, diesel/electric or electric train on steel rails through wheels.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure. It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. A magnetic suspension system for trains, said magnetic suspension system comprising:

one or more suspension/dampening assemblies per side, each said suspension/dampening assembly comprised of:

one or more permanent magnet support columns per side, each said column comprised of one or more magnetic nodules and each said magnetic nodule comprised of a central body having a North Polarity (N-Pol) permanent magnet on one side, and a South Polarity (S-Pol) permanent magnet on the other; and one or more lateral support wheel or skid per side along the upper portion of said magnet support column; and one or more lateral support wheel, ball-bearing or skid per side along the lower portion of said magnet support column;

a track having one or more magnet support column canals per side, said column support canals comprised of:

a continuous running opening having a depth and width capable of accommodating said permanent magnet support column; and one continuous ferrous metal rail per side of each said canal;

a traction canal within said track, said traction canal comprising:

a center slab having a ferrous, non-ferrous or combination rail on each side;

a right magnetic caterpillar track and a left magnetic caterpillar track, each said track comprised of:

alternate N-Pol and S-Pol magnetic slabs mounted on a continuous belt around two or more hubs; and one or more motors to rotate each said right and left caterpillar track.

2. A magnetic suspension system for trains, said magnetic suspension system comprising:

one or more suspension/dampening assemblies per side, each said suspension/dampening assembly comprised of:

one or more permanent magnet support columns per side, each said column comprised of one or more magnetic nodules and each said magnetic nodule comprised of a central body having a North Polarity (N-Pol) permanent magnet on one side, and a South Polarity (S-Pol) permanent magnet on the other; and one or more lateral support wheel or skid per side along the upper portion of said magnet support column; and one or more lateral support wheel, ball-bearing or skid per side along the lower portion of said magnet support column;

a track having one or more magnet support column canals per side, said column support canals comprised of:

a continuous running opening having a depth and width capable of accommodating said permanent magnet support column; and one continuous ferrous metal rail per side of each said canal;

a traction canal within said track, said traction canal comprised of a horizontal center slab having a ferrous, non-ferrous or combination rail on each side;

a magnetic caterpillar track comprised of:

alternate N-Pol and S-Pol magnetic slabs mounted on a continuous belt around two or more hubs; and one or more motors to rotate each said right and left caterpillar track.

3. A method for operating a magnetic suspension train, said method comprising:

providing one or more suspension/dampening assemblies per side, each said suspension/dampening assembly comprised of:

providing one or more permanent magnet support columns per side, each said column comprised of one or more magnetic nodules and each said magnetic nodule comprised of a central body having a North Polarity (N-Pol) permanent magnet on one side, and a South Polarity (S-Pol) permanent magnet on the other; and providing one or more lateral support wheel or skid per side along the upper portion of said magnet support column; and providing one or more lateral support wheel, ball-bearing or skid per side along the lower portion of said magnet support column;

providing a track having one or more magnet support column canals per side, said column support canals comprised of:

providing a continuous running opening having a depth and width capable of accommodating said permanent magnet support column;

providing one continuous ferrous metal rail per side of each said canal;

operating said train;

a traction canal within said track, said traction canal comprising:

a center slab having a ferrous, non-ferrous or combination rail on each side;

a right magnetic caterpillar track and a left magnetic caterpillar track, each said track comprised of:

alternate N-Pol and S-Pol magnetic slabs mounted on a continuous belt around two or more hubs; and one or more motors to rotate each said right and left caterpillar track.

4. A method for operating a magnetic suspension train, said method comprising:

providing one or more suspension/dampening assemblies per side, each said suspension/dampening assembly comprised of:

providing one or more permanent magnet support columns per side, each said column comprised of one or more magnetic nodules and each said magnetic nodule comprised of a central body having a North Polarity (N-Pol) permanent magnet on one side, and a South Polarity (S-Pol) permanent magnet on the other; and providing one or more lateral support wheel or skid per side along the upper portion of said magnet support column; and providing one or more lateral support wheel, ball-bearing or skid per side along the lower portion of said magnet support column;

providing a track having one or more magnet support column canals per side, said column support canals comprised of:

providing a continuous running opening having a depth and width capable of accommodating said permanent magnet support column;

providing one continuous ferrous metal rail per side of each said canal;

operating said train;

a traction canal within said track, said traction canal comprised of a horizontal center slab having a ferrous, non-ferrous or combination rail on each side;

a magnetic caterpillar track comprised of:

alternate N-Pol and S-Pol magnetic slabs mounted on a continuous belt around two or more hubs; and one or more motors to rotate each said right and left caterpillar track.

\* \* \* \* \*